US010647306B2

(12) United States Patent
Arsenault et al.

(10) Patent No.: US 10,647,306 B2
(45) Date of Patent: May 12, 2020

(54) MEASUREMENT OF CONTACT MAINTAINING CONTROL VALVE CURRENT FOR A HYDRAULIC ACTUATOR

(71) Applicant: Goodrich Corporation, Charlotte, NC (US)

(72) Inventors: Tyler Arsenault, Dayton, OH (US); Naison E Mastrocola, Goshen, CT (US)

(73) Assignee: Goodrich Corporation, Charlotte, NC (US)

( * ) Notice: Subject to any disclaimer, the term of this patent is extended or adjusted under 35 U.S.C. 154(b) by 121 days.

(21) Appl. No.: 15/960,200

(22) Filed: Apr. 23, 2018

(65) Prior Publication Data

US 2019/0322252 A1   Oct. 24, 2019

(51) Int. Cl.
| *B60T 8/17*  | (2006.01) |
| *B60T 8/171* | (2006.01) |
| *B60T 8/172* | (2006.01) |
| *B60T 8/32*  | (2006.01) |
| *F15B 13/044* | (2006.01) |
| *F15B 21/08* | (2006.01) |
| *F16D 55/24* | (2006.01) |
| *F16D 65/18* | (2006.01) |
| *G01D 5/242* | (2006.01) |
| *B64C 25/44* | (2006.01) |

(52) U.S. Cl.
CPC ............ *B60T 8/1703* (2013.01); *B60T 8/171* (2013.01); *B60T 8/172* (2013.01); *B60T 8/325* (2013.01); *F15B 13/044* (2013.01); *F15B 21/087* (2013.01); *F16D 55/24* (2013.01); *F16D 65/186* (2013.01); *G01D 5/242* (2013.01); *B60T 2270/88* (2013.01); *B64C 25/44* (2013.01)

(58) Field of Classification Search
CPC ........ B60T 8/885; B60T 13/74; B60T 13/741; B60T 13/665; B60K 7/08
USPC ................... 303/20, 15, 126, 6.01, 9.61, 14
See application file for complete search history.

(56) References Cited

U.S. PATENT DOCUMENTS

| 4,668,021 A | 5/1987 | Cook |
| 5,539,642 A | 7/1996 | Wiel |
| 5,934,767 A | 8/1999 | Schmidt et al. |
| 6,183,051 B1 * | 2/2001 | Hill .......................... B60T 8/00 303/122.03 |

(Continued)

FOREIGN PATENT DOCUMENTS

| DE | 112015005830 | 11/2017 |
| KR | 20110060260 | 6/2001 |

OTHER PUBLICATIONS

European Patent Office, European Search Report dated Sep. 9, 2019 in Application No. 19170610.0.

(Continued)

*Primary Examiner* — Robert A. Siconolfi
*Assistant Examiner* — San M Aung
(74) *Attorney, Agent, or Firm* — Snell & Wilmer, L.L.P.

(57) ABSTRACT

A method for measurement of contact maintaining control valve current for a hydraulic actuator may comprise sending, by a brake controller, a current signal to an electromechanical valve assembly, receiving, by the brake controller, a pressure feedback signal, increasing, by the brake controller, a value of the current signal, and determining, by the brake controller, a contact current value based upon the pressure feedback signal.

20 Claims, 5 Drawing Sheets

(56) References Cited

U.S. PATENT DOCUMENTS

| | | | |
|---|---|---|---|
| 6,341,552 B1 | 1/2002 | Potter et al. | |
| 7,140,699 B2 | 11/2006 | Gronau et al. | |
| 9,387,840 B1 | 7/2016 | Cahill | |
| 2003/0089535 A1* | 5/2003 | Kanzler | B60T 8/00 180/9.44 |
| 2004/0195914 A1* | 10/2004 | Beck | B60T 8/1703 303/191 |
| 2009/0242694 A1* | 10/2009 | Oyama | F15B 1/022 244/99.6 |
| 2009/0276133 A1 | 11/2009 | May et al. | |
| 2010/0274457 A1* | 10/2010 | Cahill | B60T 8/1703 701/70 |
| 2010/0276989 A1* | 11/2010 | Metzger, Jr. | B60T 8/00 303/20 |

OTHER PUBLICATIONS

Espacenet, Machine translation of KR20110060260 on Dec. 6, 2019.
Espacenet, Machine translation of DE112015005830 on Dec. 6, 2019.

* cited by examiner

MEASUREMENT OF CONTACT MAINTAINING CONTROL VALVE CURRENT FOR A HYDRAULIC ACTUATOR

FIELD

The present disclosure relates to aircraft braking systems, and more specifically, to a system and method for control over braking of an aircraft.

BACKGROUND

A common issue with pressure only feedback for hydraulic aircraft brake control is a phenomenon referred to as "Brake Fill." Brake fill is the period where a valve assembly is supplying fluid to an actuator before the actuator has established sufficient fluid volume to start building pressure in the hydraulic system. During brake fill there is no palpable feedback from pressure to identify when contact will be made. Brake fill may therefore compromise controller performance.

SUMMARY

A brake system is disclosed, comprising a brake controller, a hydraulic brake actuator including a moveable member, a brake stack, an electromechanical valve assembly in electronic communication with the brake controller and in fluid communication with the hydraulic brake actuator, and a tangible, non-transitory memory configured to communicate with the brake controller, the tangible, non-transitory memory having instructions stored thereon that, in response to execution by the brake controller, cause the brake controller to perform operations comprising sending, by the brake controller, a current signal to the electromechanical valve assembly, receiving, by the brake controller, a pressure feedback signal, increasing, by the brake controller, a value of the current signal, and determining, by the brake controller, a contact current value based upon the pressure feedback signal.

In various embodiments, the value is an amperage of the current signal.

In various embodiments, the instructions cause the brake controller to perform operations further comprising storing, by the brake controller, the contact current value to the tangible, non-transitory memory, wherein the contact current value corresponds to an amperage of the current signal corresponding to a position of the moveable member being in contact with the brake stack.

In various embodiments, the moveable member moves towards the brake stack in response to the value of the current signal being increased.

In various embodiments, the electromechanical valve assembly is configured to meter a pressure of a fluid supplied to the hydraulic brake actuator.

In various embodiments, the moveable member is held in contact with the brake stack by sending a current command comprising the contact current value to the electromechanical valve assembly.

In various embodiments, the moveable member is configured to apply mechanical pressure in response to fluidic pressure being applied to the hydraulic brake actuator in order to reduce an angular velocity of a wheel.

A tangible, non-transitory memory configured to communicate with a brake controller is disclosed. The tangible, non-transitory memory may have instructions stored thereon that, in response to execution by the brake controller, cause the brake controller to perform operations comprising sending, by the brake controller, a current signal to an electromechanical valve assembly, receiving, by the brake controller, a pressure feedback signal, increasing, by the brake controller, a value of the current signal, and determining, by the brake controller, a contact current value based upon the pressure feedback signal.

In various embodiments, the value is an amperage of the current signal.

In various embodiments, the instructions cause the brake controller to perform operations further comprising storing, by the brake controller, the contact current value to the tangible, non-transitory memory, wherein the contact current value corresponds to an amperage of the current signal corresponding to a position of a moveable member being in contact with a brake stack.

In various embodiments, wherein the brake controller causes the moveable member to move towards the brake stack in response to the value of the current signal being increased.

In various embodiments, the brake controller comprises a brake control unit (BCU).

A method for measurement of contact maintaining control valve current for a hydraulic actuator is disclosed, comprising sending, by a brake controller, a current signal to an electromechanical valve assembly, receiving, by the brake controller, a pressure feedback signal, increasing, by the brake controller, a value of the current signal, and determining, by the brake controller, a contact current value based upon the pressure feedback signal.

In various embodiments, the method further comprises storing, by the brake controller, the contact current value to a memory.

In various embodiments, the value is an amperage of the current signal.

In various embodiments, the contact current value corresponds to an amperage of the current signal corresponding to a position of a moveable member being in contact with a brake stack.

In various embodiments, the method further comprises causing, by the brake controller, the moveable member to move towards the brake stack in response to the value of the current signal being increased.

In various embodiments, the brake controller comprises a brake control unit (BCU).

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, aircraft brake systems may include a brake controller. The brake controller may be configured to control the force commanded to the braking system. In hydraulic braking systems, force may be applied via hydraulic fluid. The hydraulic system may include a shut off valve that supplies hydraulic fluid to the braking system generally. A servo valve, downstream of the shut off valve, may regulate the pressure of the hydraulic fluid supplied to the braking system.

Figure 1:
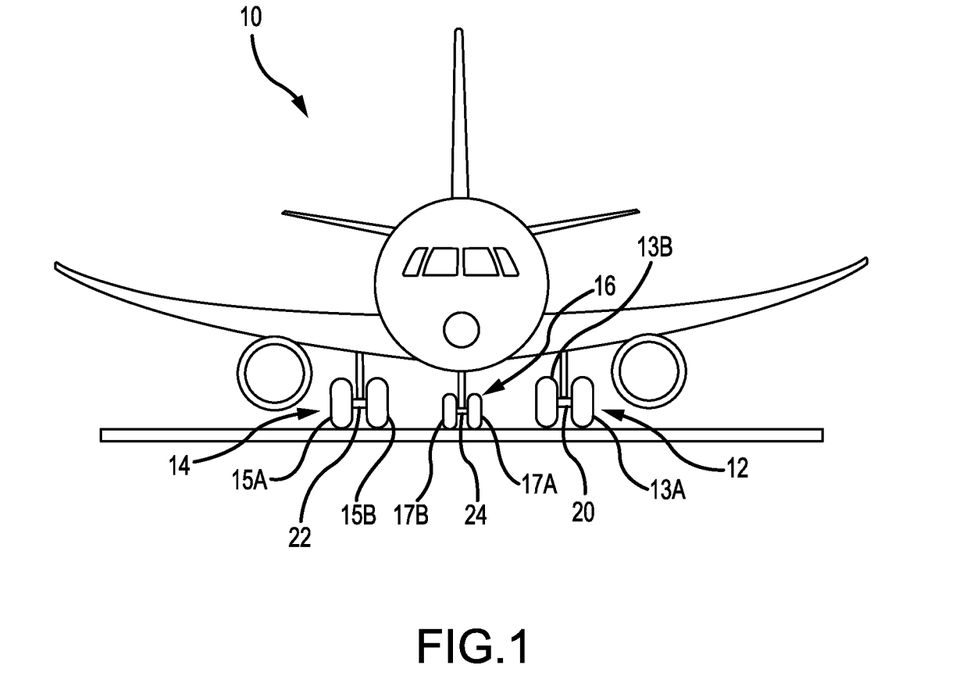
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake.

Figure 2:
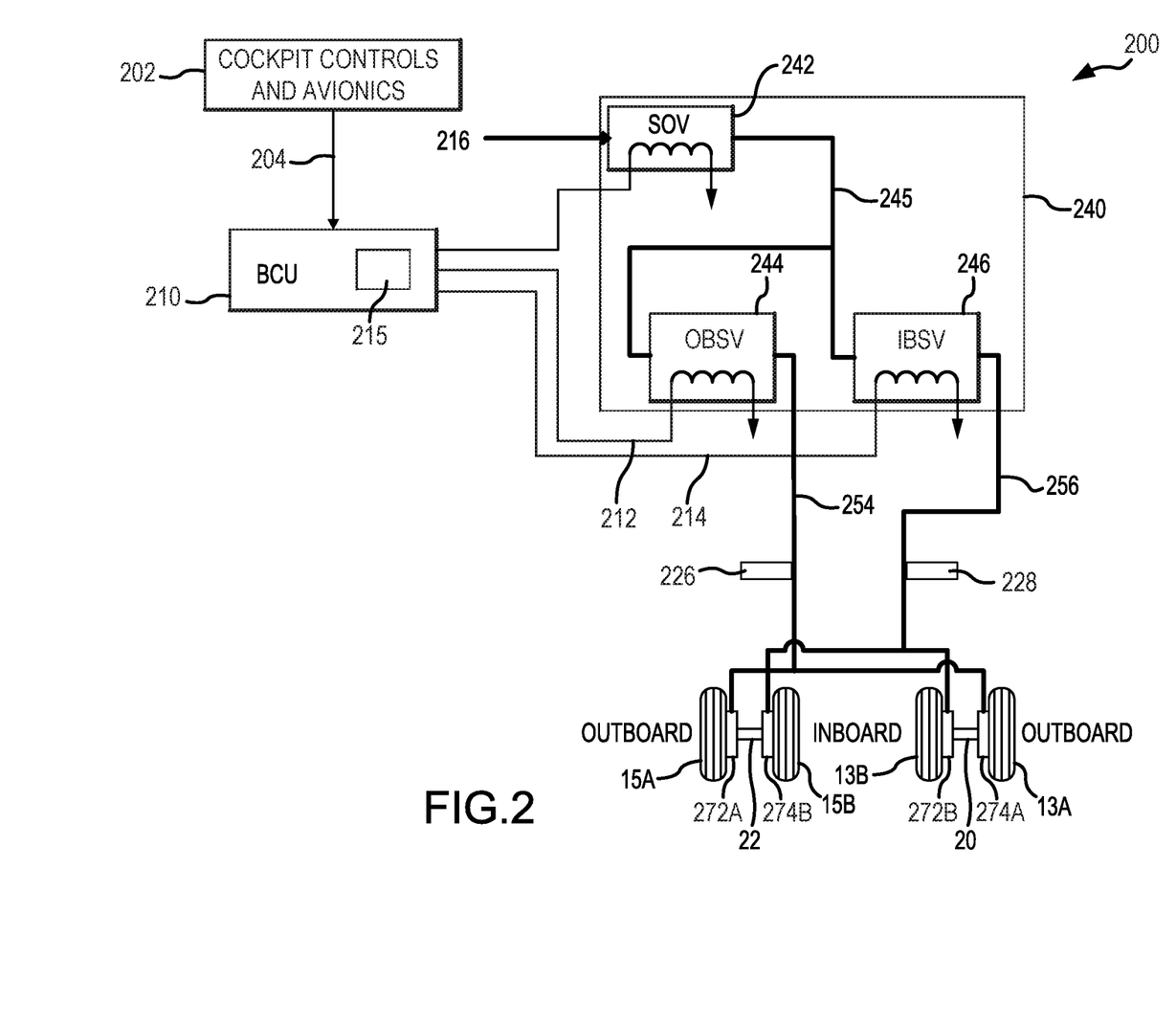
FIG. 2 illustrates a schematic view of a brake system having a brake controller including brake contact current identification logic, in accordance with various embodiments.

With reference to FIG. 2, a brake system (hereinafter "system 200") is illustrated. System 200 includes aircraft cockpit controls and aircraft avionics 202 which communicates via one or more databuses 204 with a brake controller 210. In various embodiments, brake controller 210 may be a controller and/or processor. In various embodiments, brake controller 210 may be implemented in a single controller and/or processor. In various embodiments, brake controller 210 may be implemented in multiple controllers and/or processors.

System 200 may include a module 240. Module 240 may be a brake control module (BCM). Brake controller 210 may be in electronic communication with a module 240. Module 240 may be in communication with a shut off valve (SOV) 242. SOV 242 may be supplied with pressurized hydraulic fluid 216. Pressurized hydraulic fluid 216 may be supplied from a pressurized fluid system for use during parking, braking, and emergency braking. SOV 242 may be coupled to outboard servo-valve (OBSV) 244 and inboard servo-valve (IBSV) 246 via fluid conduit 245. SOV 242 may be configured to supply OBSV 244 and IBSV 246 with pressurized hydraulic fluid in response to being in the open position. OBSV 244 and IBSV 246 may be configured to meter hydraulic fluid pressure between SOV 242 and various other brake system components via fluid conduit 254 and fluid conduit 256, respectively, as further described herein.

In various embodiments, the valves as discussed herein may be replaced with various types of valves known to a person having ordinary skill in the art. In various embodiments, SOV 242 as provided herein may comprise a valve assembly having electronics (e.g., a solenoid) that actuates a valve in response to commands from other electronics (e.g., brake controller 210). In various embodiments, OBSV 244 and IBSV 246 as provided herein may comprise a valve assembly having electronics (e.g., a solenoid comprising a coil) that actuates a valve in response to commands from other electronics (e.g., brake controller 210). In this regard, SOV 242, OBSV 244, and/or IBSV 246 may comprise electromechanical valves, such as solenoid valves for example. In this regard, SOV 242, OBSV 244, and/or IBSV 246 may be referred to herein as an electromechanical valve assembly.

In various embodiments, OBSV 244 may be coupled to outboard brakes 272A, 274A of an aircraft. IBSV 246 may be coupled to the inboard brakes 272B, 274B of an aircraft. OBSV 244 may be coupled to outboard brakes 272A, 274A via fluid conduit 254. IBSV 246 may be coupled to inboard brakes 272B, 274B via fluid conduit 256. Stated differently, OBSV 244 may be in fluid communication with outboard brakes 272A, 274A and IBSV 246 may be in fluid communication with inboard brakes 272B, 274B. Inboard brakes 272B and inboard brakes 274B may be coupled to wheel 13B and wheel 15B, respectively. Outboard brakes 272A and outboard brakes 274A may be coupled to wheel 15A and wheel 13A, respectively. Outboard brakes 272A, 274A may be configured to be operated hydraulically in order to decrease the angular velocity of a wheel. Inboard brakes 272B, 274B may be configured to be operated hydraulically in order to decrease the angular velocity of a wheel.

Figure 5:
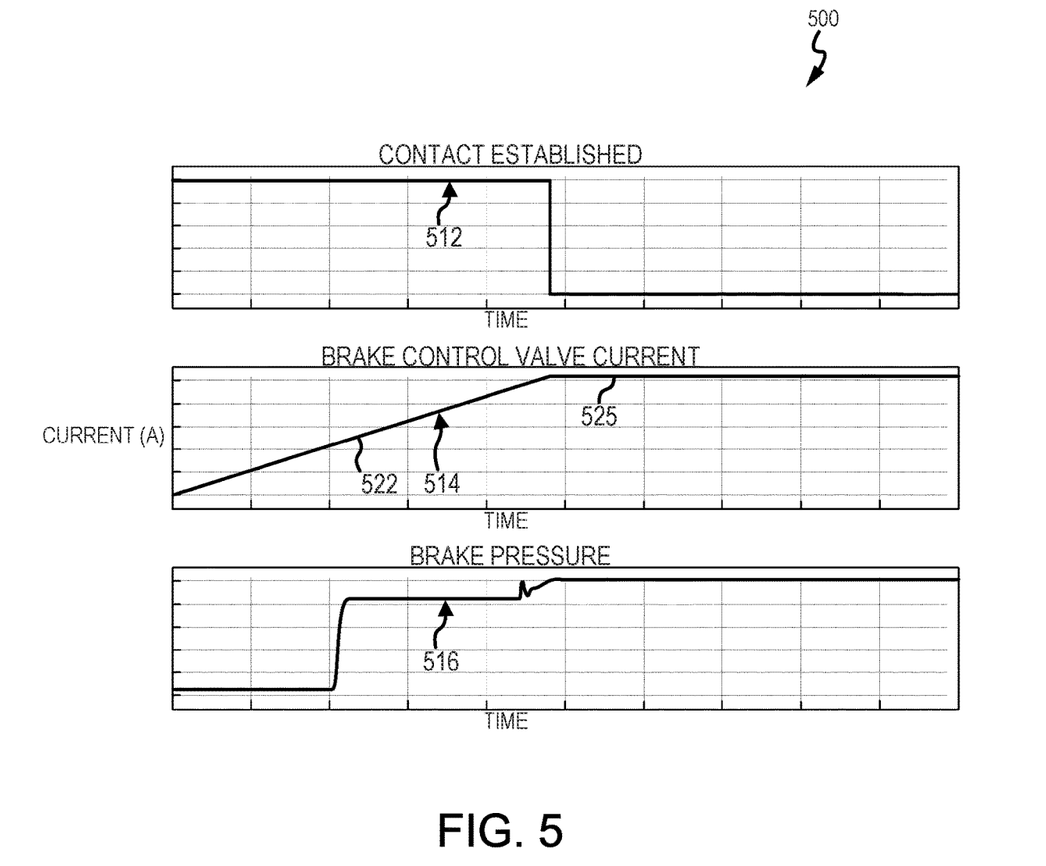
FIG. 5 illustrates time-aligned graphs illustrating various signals during measurement of contact maintaining control valve current for a hydraulic actuator, in accordance with various embodiments.

With combined reference to FIG. 2 and FIG. 5, OBSV 244 may be configured to meter fluid pressure between SOV 242 and outboard brakes 272A, 274A. In various embodiments, brake controller 210 may send a current signal 514 to OBSV 244 via bus 212. OBSV 244 may meter fluid pressure between SOV 242 and outboard brakes 272A, 274A in response to the current signal 514. Current signal 514 may comprise a variable electrical current value that may be measured in milliamps (mA).

IBSV 246 may be configured to meter fluid pressure between SOV 242 and inboard brakes 272B, 274B. In various embodiments, brake controller 210 may send a current signal 514 to IBSV 246 via bus 214. IBSV 246 may meter fluid pressure between SOV 242 and inboard brakes 272B, 274B in response to the current signal 514.

In various embodiments, a first pressure sensor 226 may detect a pressure of the hydraulic fluid downstream from OBSV 244. In various embodiments, a second pressure sensor 228 may detect a pressure of the hydraulic fluid downstream from IBSV 246. First pressure sensor 226 may be located at any suitable location downstream from OBSV 244 for detecting the hydraulic fluid pressure. For example, first pressure sensor 226 may be located at OBSV 244 or may be located at outboard brake 272A.

Figure 3A:
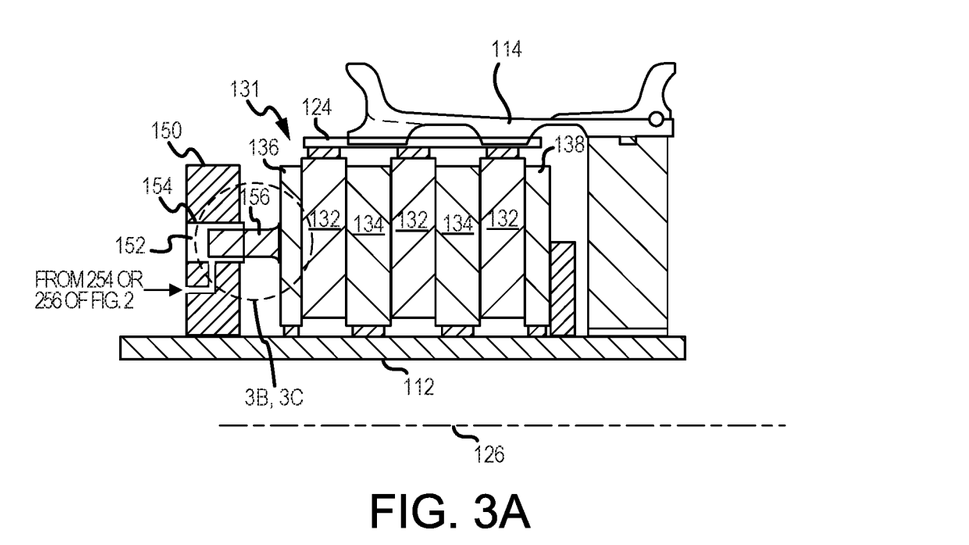
FIG. 3A illustrates a schematic view of a hydraulic brake arrangement, in accordance with various embodiments.

With reference to FIG. 3A, an exemplary aircraft wheel braking arrangement 100, such as may be found on an aircraft in accordance with various embodiments, is illustrated. Aircraft wheel braking arrangement 100 may, for example, comprise a bogie axle arrangement (axle) 112, a wheel 114, one or more torque bars 124, a wheel rotational axis 126, an actuator housing 150, a hydraulic brake actuator 154, multiple brake rotors 132, multiple brake stators 134, a pressure plate 136, and an end plate 138. Multiple brake rotors 132, multiple brake stators 134, pressure plate 136, and end plate 138 may be collectively referred to herein as a brake stack 131.

Brake disks (e.g., interleaved rotors 132 and stators 134) may be disposed surrounding axle 112 and between wheel 114 and hydraulic brake actuator 154. Torque bars 124 may be secured to wheel 114. Rotors 132 may be secured to torque bars 124 for rotation with wheel 114, while stators 134 may be engaged with axle 112. In this regard, axle 112 may be in mechanical engagement with brake stack 131 and configured to transfer torque from brake stack 131 to actuator housing 150. For example, at least one hydraulic brake actuator 154 may be operable to compress interleaved rotors 132 and stators 134 for stopping the aircraft. In the various embodiments, hydraulic brake actuator 154 comprises a hydraulically actuated piston (also referred to herein as a moveable member) 156. Pressure plate 136 and end plate 138 may be disposed at opposite ends of the interleaved rotors 132 and stators 134. Rotors 132 and stators 134 may comprise any material suitable for friction disks, including ceramics or carbon materials, such as a carbon/carbon composite.

Through compression of interleaved rotors 132 and stators 134 between pressure plate 136 and end plate 138, the resulting frictional contact slows rotation of wheel 114. Axle 112 may be secured to a stationary portion of the landing gear arrangement such as actuator housing 150 such that axle 112 and stators 134 are prevented from rotating during braking of the aircraft.

Figure 3B:
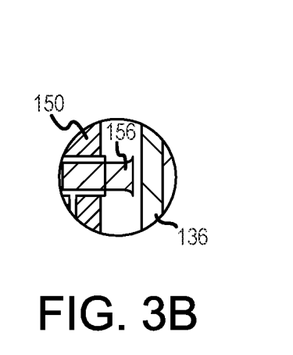
FIG. 3B and FIG. 3C illustrate the hydraulic brake actuator of FIG. 3A with the hydraulic brake actuator piston out of contact and in contact with a brake stack, respectively, in accordance with various embodiments.
Figure 3C:
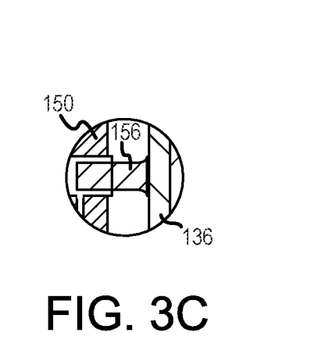

In various embodiments, actuator housing 150 may define a fluid chamber 152 whereby a fluid, such as hydraulic fluid for example, may apply pressure to piston 156, thereby causing piston 156 to extend and apply a force on brake stack 131. When hydraulic brake actuator 154 is deactivated, (e.g., when pressurized hydraulic fluid is not supplied to fluid chamber 152) piston 156 may be retracted and may not be in contact with pressure plate 136 as illustrated in FIG. 3B. For example, a biasing member may retract piston 156 into hydraulic brake actuator 154. When hydraulic brake actuator 154 is activated, (e.g., when pressurized hydraulic fluid is supplied to fluid chamber 152) piston 156 may extend and contact pressure plate 136 as illustrated in FIG. 3C. Stated differently, piston 156 may be configured to apply mechanical pressure to brake stack 131 in response to fluidic pressure being applied to hydraulic brake actuator 154 in order to reduce an angular velocity of wheel 114.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, with reference now to FIG. 2, brake controller 210 may be implemented in a machine-readable non-transitory medium and performed by a controller. In various embodiments, brake controller 210 may be implemented on a special use controller, field programmable gate array, or the like. In various embodiments, brake controller 210 may be implemented on one or more controllers. In various embodiments, brake controller 210 may be implemented in a brake control unit (BCU).

In various embodiments, brake controller 210 may comprise a brake contact current identification logic 215 configured to determine a current value corresponding to a hydraulic pressure at which a brake piston establishes contact with a brake stack. With additional reference to FIG. 4, brake contact current identification logic 215 may execute the instructions as illustrated by method 400. Method 400 includes sending, by a brake controller, a current signal to an electro-hydraulic servo valve (step 410). Step 410 may include sending, by brake controller 210, current signal 514 to OBSV 244. Step 410 may include sending, by brake controller 210, current signal 514 to IBSV 246. With additional reference to FIG. 5, exemplary graphs 500 illustrating various signals during measurement of contact maintaining control valve current for a hydraulic actuator is illustrated, in accordance with various embodiments. Stated differently, step 410 may include sending, by brake controller 210, current signal 514 to OBSV 244 and/or IBSV 246.

Figure 4:
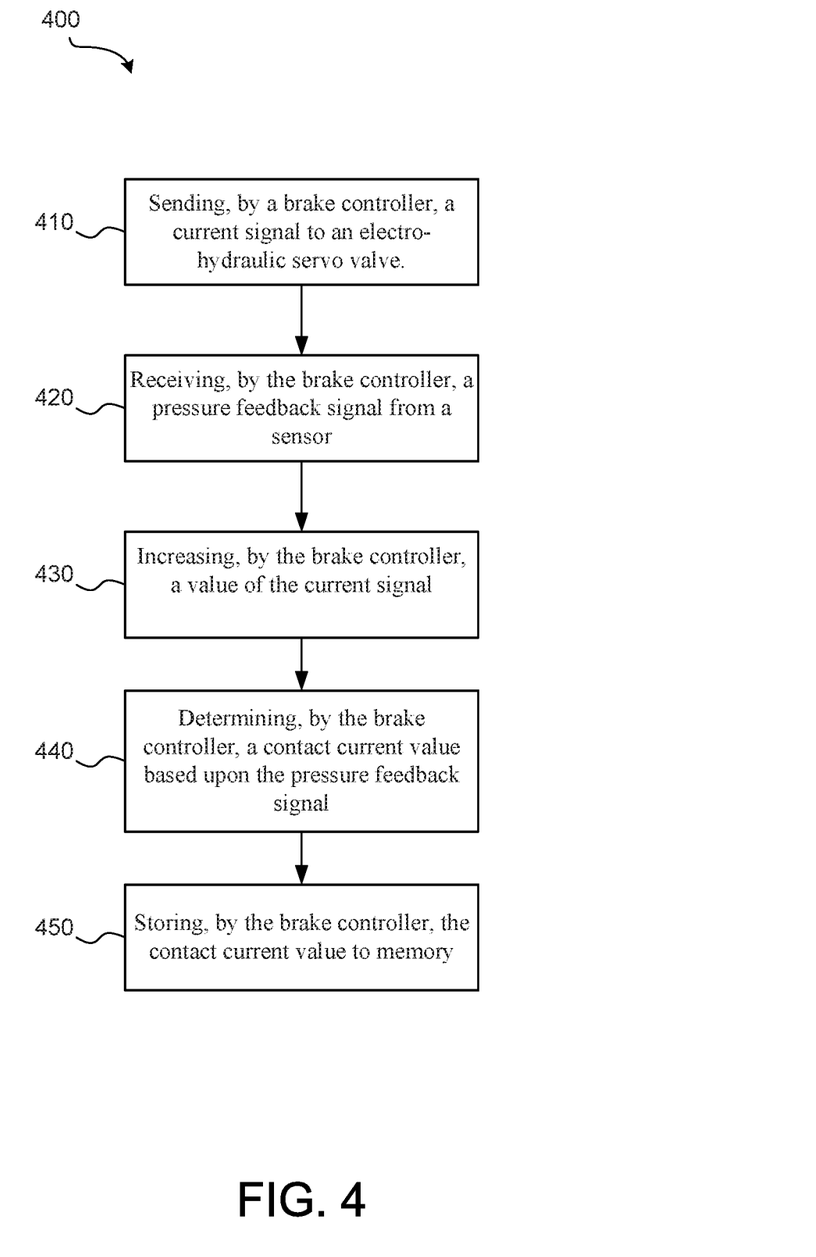
FIG. 4 illustrates a method for measuring contact maintaining control valve current for a hydraulic actuator, in accordance with various embodiments.

Method 400 includes receiving, by the brake controller, a pressure feedback signal from a sensor (step 420). Step 420 may include receiving, by brake controller 210, pressure feedback signal 516. In various embodiments, pressure feedback signal 516 may be measured by first pressure sensor 226 and/or second pressure sensor 228. Pressure feedback signal 516 may comprise a voltage signal or a current signal corresponding to the pressure of hydraulic fluid reacting with piston 156.

Method 400 includes increasing, by the brake controller, a value of the current signal (step 430). Step 430 may include increasing, by brake controller 210, a value of current signal 514. With particular focus on FIG. 5, step 430 may include increasing the current/amperage of current signal 514. In this regard, current signal 514 may comprise a ramp 522. Current signal 514 may represent the electrical current signal sent to OBSV 244 and/or IBSV 246, e.g., via bus 212 and/or bus 214, respectively. In this regard, OBSV 244 and/or IBSV 246 may be referred to herein as a brake control valve.

Method 400 includes determining, by the brake controller, a contact current value based upon the pressure feedback signal (step 440). Step 440 may include determining, by brake controller 210, a contact current value 525 based upon pressure feedback signal 516. With combined reference to FIG. 3A and FIG. 5, as current signal 514 increases in amperage, OBSV 244 and/or IBSV 246 may move to provide an increase in pressure of hydraulic fluid in fluid chamber 152, forcing piston 156 to move towards pressure plate 136. As pressure builds, the magnitude of pressure feedback signal 516 will increase providing an indication of the value of current signal 514 (i.e., contact current value 525) corresponding to when piston 156 contacts pressure plate 136. For example, brake controller 210 may detect contact between piston 156 and pressure plate 136 in response to an increase, a spike, a slope, or a threshold value, among others, in pressure feedback signal 516. In various embodiments, brake controller 210 may utilize a contact established signal 512 to indicate that piston 156 has established contact with brake stack 131. In various embodiments, contact established signal 512 may comprise a Boolean signal for indicating whether or not contact has been established, in response to which brake controller 210 may stop increasing the value of current signal 514. Stated differently, brake controller 210 may maintain the contact current value 525 in response to brake controller 210 determining that contact between piston 156 and brake stack 131 has been established.

Method 400 includes storing, by the brake controller, the contact current value to memory (step 450). Step 450 may include storing, by brake controller 210, contact current value 525 to memory. In this regard, contact current value 525 may be used as a minimum current supplied to OBSV 244 and/or IBSV 246 during braking to reduce or eliminate the time between when a command to clamp a brake stack is issued and when a hydraulic actuator piston contacts the brake stack to begin dissipating energy to reduce the rotational velocity of a wheel. Stated differently, piston 156 may be held in contact with pressure plate 136 in a standby mode before a braking command is issued to apply significant force to the brake stack 131 for reducing rotational velocity of wheel 114.

In various embodiments, with combined reference to FIG. 2, FIG. 3, and FIG. 5, in response to it no longer being desirable to have running clearance between piston 156 and pressure plate 136 for allowing brake rotors 132 to freely spin (e.g., during touch down of a landing event), contact current value 525 may be issued to hold piston 156 in contact with pressure plate 136 in a standby position. At this point, brake controller 210 may switch to pressure control of hydraulic brake actuator 154 for applying braking force to brake stack 131. In this manner, system 200 may be comprise an enhanced response time.

In various embodiments, with combined reference to FIG. 1, FIG. 2, FIG. 4, and FIG. 5, brake controller 210 may perform the instructions of method 400 during flight. For example, brake controller 210 may perform the instructions of method 400 before each landing of aircraft 10. In this manner, the effects of the environmental characteristics, such as temperature, at the location of aircraft 10 may be taken into account when determining contact current value 525. In this regard, contact current value 525 may vary depending on environmental conditions and/or the age of system 200, among other factors.

In various embodiments, brake controller 210 may perform the instructions of method 400 at any time, such as during flight or on the ground, including at the gate, during preflight checks, etc.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system, comprising:
 a brake controller;
 a hydraulic brake actuator including a moveable member;
 a brake stack;
 an electromechanical valve assembly in electronic communication with the brake controller and in fluid communication with the hydraulic brake actuator; and
 a tangible, non-transitory memory configured to communicate with the brake controller, the tangible, non-transitory memory having instructions stored thereon that, in response to execution by the brake controller, cause the brake controller to perform operations comprising:

sending, by the brake controller, a current signal to the electromechanical valve assembly;

receiving, by the brake controller, a pressure feedback signal;

increasing, by the brake controller, a value of the current signal; and determining, by the brake controller, a contact current value based upon the pressure feedback signal.

2. The brake system of claim 1, wherein the instructions cause the brake controller to perform operations further comprising storing, by the brake controller, the contact current value to the tangible, non-transitory memory.

3. The brake system of claim 1, wherein the value is an amperage of the current signal.

4. The brake system of claim 1, wherein the contact current value corresponds to an amperage of the current signal corresponding to a position of the moveable member being in contact with the brake stack.

5. The brake system of claim 4, wherein the moveable member moves towards the brake stack in response to the value of the current signal being increased.

6. The brake system of claim 5, wherein the electromechanical valve assembly is configured to meter a pressure of a fluid supplied to the hydraulic brake actuator.

7. The brake system of claim 6, wherein the moveable member is held in contact with the brake stack by sending a current command comprising the contact current value to the electromechanical valve assembly.

8. The brake system of claim 7, wherein the moveable member is configured to apply mechanical pressure in response to fluidic pressure being applied to the hydraulic brake actuator in order to reduce an angular velocity of a wheel.

9. A tangible, non-transitory memory configured to communicate with a brake controller, the tangible, non-transitory memory having instructions stored thereon that, in response to execution by the brake controller, cause the brake controller to perform operations comprising:

sending, by the brake controller, a current signal to an electromechanical valve assembly;

receiving, by the brake controller, a pressure feedback signal;

increasing, by the brake controller, a value of the current signal; and determining, by the brake controller, a contact current value based upon the pressure feedback signal.

10. The tangible, non-transitory memory of claim 9, wherein the instructions cause the brake controller to perform operations further comprising storing, by the brake controller, the contact current value to the tangible, non-transitory memory.

11. The tangible, non-transitory memory of claim 9, wherein the value is an amperage of the current signal.

12. The tangible, non-transitory memory of claim 9, wherein the contact current value corresponds to an amperage of the current signal corresponding to a position of a moveable member being in contact with a brake stack.

13. The tangible, non-transitory memory of claim 12, wherein the brake controller causes the moveable member to move towards the brake stack in response to the value of the current signal being increased.

14. The tangible, non-transitory memory of claim 13, wherein the brake controller comprises a brake control unit (BCU).

15. A method for measurement of contact maintaining control valve current for a hydraulic actuator, comprising:

sending, by a brake controller, a current signal to an electromechanical valve assembly;

receiving, by the brake controller, a pressure feedback signal;

increasing, by the brake controller, a value of the current signal; and determining, by the brake controller, a contact current value based upon the pressure feedback signal.

16. The method of claim 15, further comprising storing, by the brake controller, the contact current value to a memory.

17. The method of claim 15, wherein the value is an amperage of the current signal.

18. The method of claim 15, wherein the contact current value corresponds to an amperage of the current signal corresponding to a position of a moveable member being in contact with a brake stack.

19. The method of claim 18, further comprising causing, by the brake controller, the moveable member to move towards the brake stack in response to the value of the current signal being increased.

20. The method of claim 19, wherein the brake controller comprises a brake control unit (BCU).

* * * * *